United States Patent [19]
Espenschied

[11] 3,958,466
[45] May 25, 1976

[54] ELECTRO-HYDRAULIC GEAR SHIFTING CONTROL FOR VEHICLE GEARS

[75] Inventor: Helmut Espenschied, Ludwigsburg, Germany

[73] Assignee: Robert Bosch G.m.b.H., Gerlingen-Schillerhohe, Germany

[22] Filed: Feb. 27, 1974

[21] Appl. No.: 446,140

[30] Foreign Application Priority Data
Apr. 19, 1973 Germany............................ 2319961

[52] U.S. Cl.................................... 74/867; 137/115
[51] Int. Cl.².......................................... B60K 41/04
[58] Field of Search............. 74/863, 864, 867, 843, 74/868; 137/115, 625.61, 625.64, 625.66, 625.68

[56] References Cited
UNITED STATES PATENTS
| | | | |
|---|---|---|---|
| 3,225,619 | 12/1965 | Schaefer............................. | 74/868 |
| 3,656,496 | 4/1972 | Uenoyama et al.............. | 137/115 X |
| 3,727,487 | 4/1973 | Forster et al. .................... | 74/867 X |

Primary Examiner—Benjamin W. Wyche
Assistant Examiner—Frank H. McKenzie, Jr.
Attorney, Agent, or Firm—Flynn & Frishauf

[57] ABSTRACT

Hydraulic gear shift controllers to effect change of transmission gearing are controlled by means of a spool valve having a slider spool located in the bore of a housing, preferably axially aligned with a pressure limiting spool valve. A kick-down hydraulic control line is rapidly activated by an electrical controller which admits pressurized fluid to an end face of the spool, communication of the kickdown pressure control line with the main pressure controller being effected through a blind bore of the main slider spool, and cross bores formed therein to provide rapid control in dependence on electrical signals representative of an engine operating parameter, such as engine speed, or throttle position, and to apply a bias pressure on the slider spool.

4 Claims, 1 Drawing Figure

U.S. Patent  May 25, 1976  3,958,466
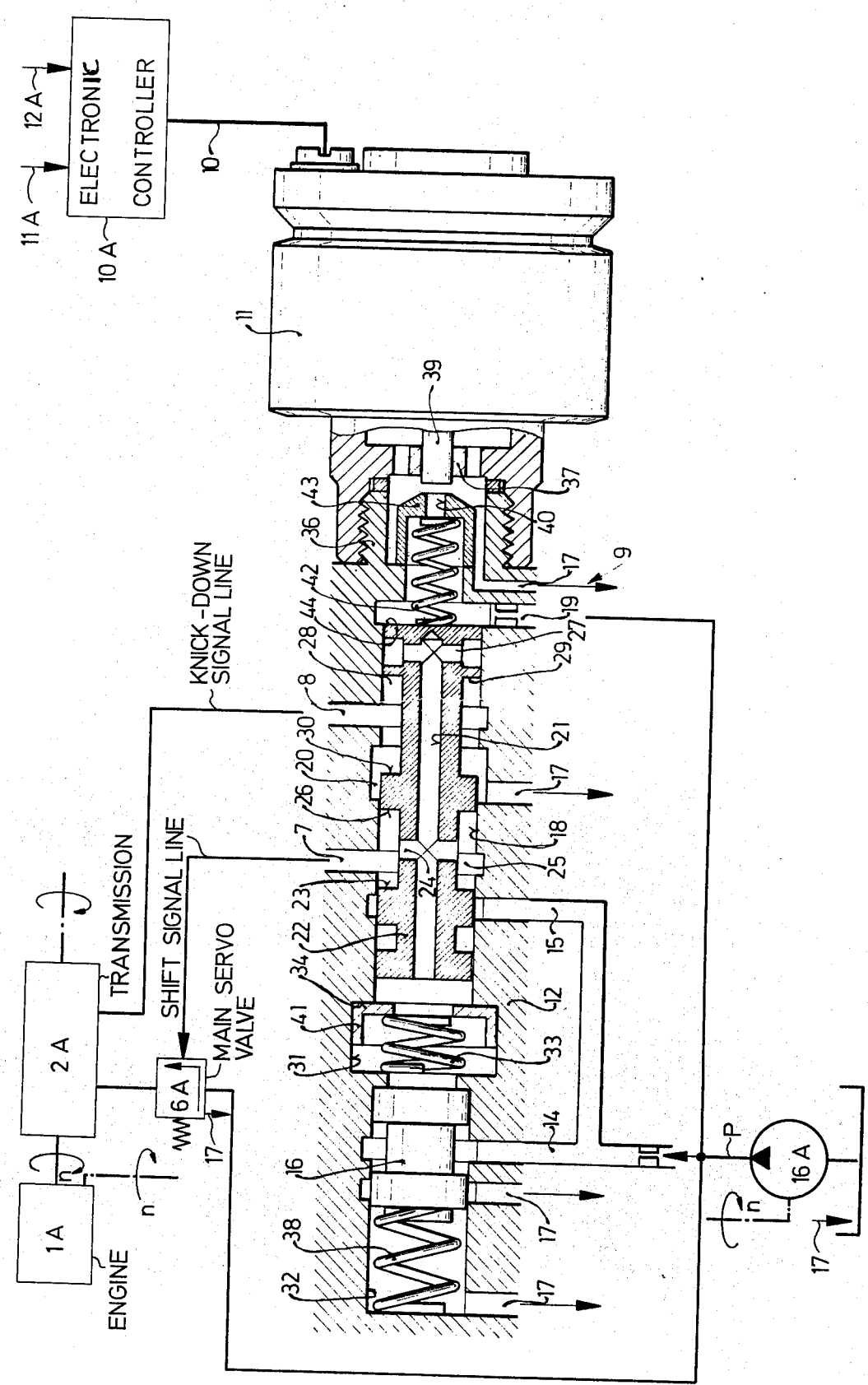

ELECTRO-HYDRAULIC GEAR SHIFTING CONTROL FOR VEHICLE GEARS

CROSS REFERENCE TO RELATED APPLICATIONS

U.S. Pat. No. 3,835,733; U.S. Pat. No. 3,851,285; U.S. Ser. No. 464,809, filed Apr. 29, 1974; U.S. Ser. No. 288,254, now U.S. Pat. No. 3,785,224; assigned to the assignee of the present invention.

The present invention relates to electro-hydraulic shifting of vehicle gears, and more particularly to a system in which, for each gear ratio, hydraulic gear shifting elements are provided which are subject to a main shifting or switching pressure. The switching pressure of a main valve is controlled by a controlled valve, of the spool type, having a valve spool which is, in turn, controlled by engine speed, and/or the position of the engine fuel controller, for example the engine throttle. The slider or spool additionally is influenced by a pressure limiting spool and a springy, or resilient limit stop.

Switching devices of this kind have been proposed which have an electro-hydraulic transducer and a pressure reducer, or pressure limiter. The end portion of the slider spool is mechanically coupled to a controlled electro-magnet. The other end portion can abut a resilient abutment, to limit the movement of the slider spool. Such an arrangement is advantageous since the control pressure and the spring force can balance each other. Such a balance occurs, however, usually only at full loading, and is independent of changes in various operating parameters. The control slider and the pressure limiting slider are usually arranged parallel to each other, and there are feedback lines by means of ducts, located in the housing of the control system. Such a control system, thus, requires two separate units both for the kick-down signal, as well as for the pressure controller, namely the pressure limiter, or reducer, and the electro-hydraulic transducer.

It is an object of the present invention to simplify such a control system in such a manner that only a single structural element is needed for both signals, and which is capable of handling both pressure limitation as well as the kick-down signal.

SUBJECT MATTER OF THE PRESENT INVENTION

Briefly, the signals control a pressure control valve which generates a bias control pressure on the slider or spool of the valve. The invention is based on the consideration that the gear shifting pressure commanded by the throttle position of the engine, that is, engine loading, as well as the control valve bias pressure change within the control range proportionally to each other; upon further change of the bias pressure, however, the gear shifting pressure remains constant. Further increase in the control valve bias pressure then results in the bias pressure moving the slider or spool of the valve to communicate the kick-down duct with the gear shift supply pressure, which extreme movement reliably, and with a proper safety margin, separates the normal control range of movement of the slider from a kick-down movement.

A valve of this type may be constructed to be particularly compact with only a single housing if, in accordance with a feature of the invention, the control slider or spool and the pressure limiting slider are arranged in axially aligned position. The control slider is returned to normal position by pressures applied thereto by means of ducts and bores in the housing of the valve arrangement. This has led to structures of substantial size. In accordance with a further feature of the invention, therefore, the control slider is formed with an axially aligned bore and a diametrical cross bore which terminates in a ring duct, which permits substantial decrease in the size of the valve housing and thus a compact arrangement. By forming a second cross bore, communicating with a second ring duct, the throttle pressure and the kick-down pressure can be derived from a single main line.

The invention will be described by way of example with reference to the accompanying drawings, wherein the single FIGURE is a schematic longitudinal sectional view through the valve and the slider spool in accordance with the present invention.

The valve in accordance with the present invention can be used in a system as explained, in detail, in cross-referenced application Ser. No. 288,254. The engine 1A of the motor vehicle is connected by a suitable shaft to an automatic transmission 2A, the details of which are explained in the aforementioned cross-referenced application. Transmission 2A can be shifted between several speeds by hydraulically operating shifting means, such as clutches, brake bands, and the like.

A main servo valve 6A is connected to the transmission 2A, to supply shifting pressure applied from a hydraulic pump 16A. The hydraulic pump 16A supplies pressurized hydraulic fluid over a line P, and receives return flow of the pressurized fluid from drainage lines 17. In the drawing, the elements common to those of the cross-referenced application have been given the same reference numerals, with an A added. An electronic controller 10A receives input signals representative, for example, of speed of engine 1A, over a line 11A and input signals representative of the position of the engine controller, for example the accelerator pedal over a line 12A. Engine 1A also drives pump 16A, as schematically indicated by the chain-dotted lines $n$ from engine 1A.

The control valve and the transducer are all connected to a housing 12 which is formed with an axially aligned bore, in various sections. Bore 18 accepts the main slider or control valve spool 22. Main pressure lines 14, 15, 19 have hydraulic pressure, for example oil or transmission fluid under pressure applied thereto. A shift signal line 7 applies hydraulic pressure to servo 6A. Line 8 is the kick-down line and leads to a gear controller of transmission 2a, or a kick-down slider, respectively, and may generally be referred to as a kick-down device, to effect down-shift of the gears. The outlet ducts, leading to a drain or sump from which hydraulic pressure is again re-circulated, are indicated at 17. A number of such drain connections are shown. A ring duct 20 communicates with the drain lines 17, lines 17 having, effectively, no back-pressure, and leading to the suction stub of the hydraulic pump for the entire system. The pump is shown at 16A.

The control slider 22 is formed with blind axial bore 21. A diametrical cross bore 24 terminates in a first ring duct 25, defined by two control edges or surfaces 23, 26. A second cross bore 27 also communicates with blind bore 21 and terminates in a second ring duct 28. The slider spool 22 is, further, formed with circumferential rings defining two additional control edges or surfaces 29, 30.

A bore 31, co-axial with bore 18 has a ring-shaped stop member 41 located therein (at the left side of the FIGURE). Stop 41 is pressed by a spring 33 against the edge 34 of an abutment formed in the housing 12. The main pressure line 14 can also communicate with axial bore 32 at the left side of the stop 41. Two drain openings 17 in bore 32 permit drainage of hydraulic pressure fluid. A pressure limiting spool or slider 16 is located in bore 32. A spring 38 holds the pressure limiting spool 16 in its extreme right-hand position (see the FIGURE).

A controller 11 is connected to the housing 12 by means of coupling 36. The controller 11 has a push pin 39 projecting therefrom which is axially movable in a guide spider 37 by means of a magnet, not shown in detail. The push pin 39 cooperates with a passage way 40 of a valve seat 43 in such a manner that the ring-shaped flow opening is increased, or decreased in accordance with the position of the push pin 39, controlled by an electrical signal connected to line 10 of the controller 11. In dependence on magnetic force transduced by the magnet in controller 11, the push pin 39 moves between right and left in the FIGURE. The liquid flow to drain lines 17 is thereby controlled. Spring 42, seated within the valve seat 43 has the tendency to push the main slider spool 22 to its left end position. The bore 18 terminates in a ring groove communicating with pressure line 19.

OPERATION

Let it be assumed the vehicle is proceeding normally, and no rapid acceleration is commanded. Such rapid acceleration may, for example, occur in a passing maneuver. An equilibrium condition will obtain in the control valve 9. This is the condition illustrated in the FIGURE. Let it be next assumed that the signal in line 10 changes, for example upon changing of the throttle position of the engine if the driver presses down on the accelerator pedal to execute a passing maneuver. The push pin 39 is projected, so that the push pin 39 moves towards the valve seat 43, thus decreasing the drainage. This increases the bias pressure from line 19 acting on the end face of the slider spool 22, shifting the slider spool 22 towards the left. This shift towards the left is limited by the pressure limiting spool or slider 16. The bias pressure acting on the end face of slider spool 22 may rise, as a maximum, up to the main pressure. The pressure in shift signal line 7, however does not rise any more being limited by the pressure limiting slider 16 which may move to the left, under fluid pressure from line 15 applied against its right face through the axial bore 21 of main slider spool 22 and the apertured stop member 41. and permitting bleeding of fluid via lines 14–17. Upon shift towards the left, the slider 22 loses all control function. When the spool 22 has shifted to the left to such an extent that the ring duct 28 reaches the kick-down duct 8, a connection is effected from line 15 through the cross bore 24, the blind internal, axial bore 21 and the second cross bore 27 to the kick-down duct 8. Upon pressure at the level of line 15 being applied to the kick-down duct 8, the gear shift mechanism, controlled by pressure in the line 8, can down-shift the gears.

Preferably, each gear transmission step of the vehicle gear, that is, first, second, third, fourth (if provided) has a hydraulic main switching element which effects connection of the appropriate gear in the drive train of the vehicle. This connection, that is, the gear shifting operation itself is effected by the main hydraulic pressure under control of a main valve. The operation of this main valve, in turn, is controlled by hydraulic pressure derived from a control line, such as line 8 in the FIGURE, which controls changing of gears from one step to the next lower one.

I claim:

1. Electro-hydraulic gear shifting control unit for vehicle gears having hydraulic gear shift controllers for the vehicle transmission gears providing different gear ratios for the vehicle and having a spool valve (9) comprising a unitary housing (12);

a single valve spool bore (18) formed in the housing;

a main slider spool (22) located in the bore (18);

a source of hydraulic pressure (16A; P);

ring ducts formed in the slider spool (22);

pressure fluid lines (14, 15, 19) connected to said source and providing pressurized hydraulic fluid connected to the bore (18) and drain lines (17) to drain hydraulic fluid from the bore (18);

control pressure lines (7, 8) including a shift signal line (7) and a kick-down control line (8) connected to the bore (18) and providing hydraulic pressure fluid to the vehicle transmission;

a pressure limiting slider (16) located in said bore in axial alignment with the main slider spool (22) connected to one of the pressure fluid lines (14) and controlling the pressure fluid supplied to the bore (18);

said spool valve (9) providing hydraulic pressure, as controlled by said pressure limiting slider (16) over the shift signal line (7) to effect shifting of the gears by supplying a shift control pressure to the gear shift controller upon axial shift of the slider spool (22) in a first direction;

a resiliently supported (32) abutment (41) located in said bore (18), in axial alignment with, and facing the slider spool (22) and located to be resiliently engageable by said spool (22) upon movement of said spool in said one direction;

the main slider spool (22) being formed with an axial blind bore (21);

a first diametrical cross bore (24) communicating the axial blind bore (21) with the outside surface of the slider spool, and terminating in a first ring duct (25) formed in the housing and the spool, and a second diametrical cross bore (27), axially offset from said first cross bore (24) communicating the axial blind bore (21) with the outside surface of the slider spool (22) and terminating in a second ring duct (28) formed in the circumference of the slider spool, one of said ducts (25) being located to communicate with the shift signal line (7) and to have pressure fluid applied thereto upon displacement of the main slider spool (22), and the other of said ducts (28) being located to communicate with the kick-down line (8) and to have pressure fluid applied thereto upon displacement of the main slider spool (22);

electro-hydraulic valve means (19, 39, 40, 43, 17; 11) electrically controlled by an engine operating parameter comprising at least one of: (a) engine speed; (b) engine throttle position; and controlling admission of pressurized hydraulic fluid from said source (16A; P) to said bore (18) to act on said slider spool (22) and thereby effect axial shift of said spool in said direction by applying a pressure, as controlled by said electro-hydraulic valve means on the main slider spool (22), the electro-hydraulic valve means providing a bias pressure on the main slider spool (22) and including a hydraulic pressure connection (19) from said pressure source (16A; P) to an axially facing surface (44) of the slider spool;

and an electrically controlled valve (43, 40, 39; 11) controlled by said engine operating parameter controlling the pressure of fluid admitted from said pressure source (16A; P) acting on the main slider spool (22), the pressure acting against the axially directed face of the main slider spool (22) being effective to shift the position of the main slider spool (22) in said one direction to effect communication between a hydraulic pressure fluid line (15) connected to said one pressure fluid line (14) and having said controlled pressure therein, and the kick-down pressure line (8) to provide for independent connection of controlled hydraulic pressure to said kick-down pressure line (8) under command of the pressure applied against the axially facing surface of the slider spool (22) as controlled by said electrically controlled valve.

2. Control unit according to claim 1, wherein the electro-hydraulic valve means (11, 39) is located in axial alignment with said bore (18) and includes a valve operating element (39) axially extending into said bore (18).

3. Control according to claim 1, wherein the electrically controlled valve comprises electromagnetic means (10, 11);

and a drain valve connected to said pressure connection including a movable means (39), the position of which is controlled by said valve and controlling the effective opening of the valve to permit drainage of pressurized fluid from said source (16A; P) and hence controlling the pressure applied against the axially facing surface of the slider spool (22).

4. Control unit according to claim 1, wherein the parameter controlling the electro-hydraulic valve means (19, 39, 40, 43, 17) providing for bias pressure application comprises engine throttle position to provide a rapid bias pressure rise upon maximum increase in engine throttle opening to provide for rapid connection of the kick-down pressure line to the fluid pressure line upon complete opening of the throttle of the engine.

* * * * *